Aug. 25, 1964 — R. B. RANSOM — 3,145,621
METHOD OF AND TOOL FOR CUTTING ANNULAR FACE GEARS
Filed Dec. 22, 1961 — 2 Sheets-Sheet 1
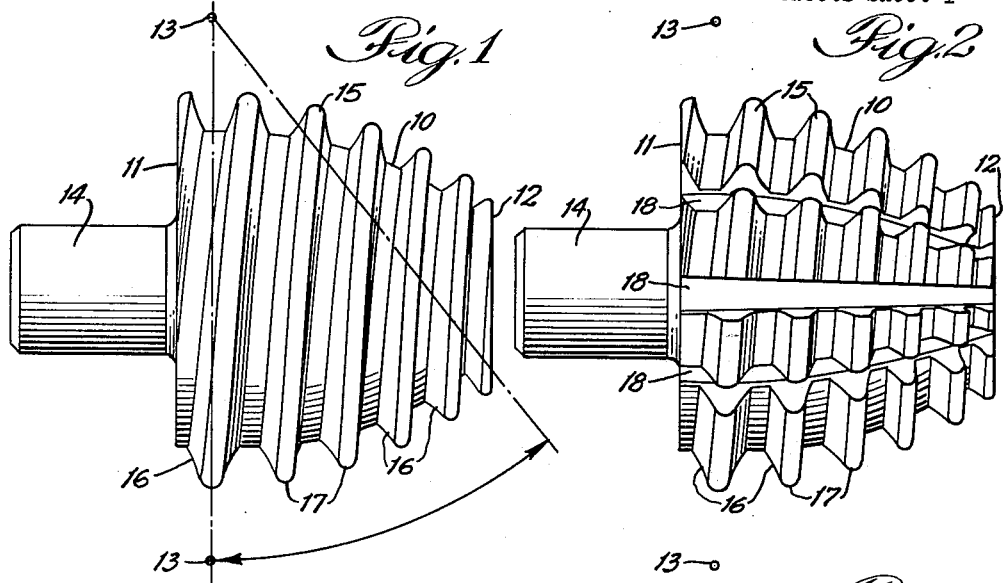
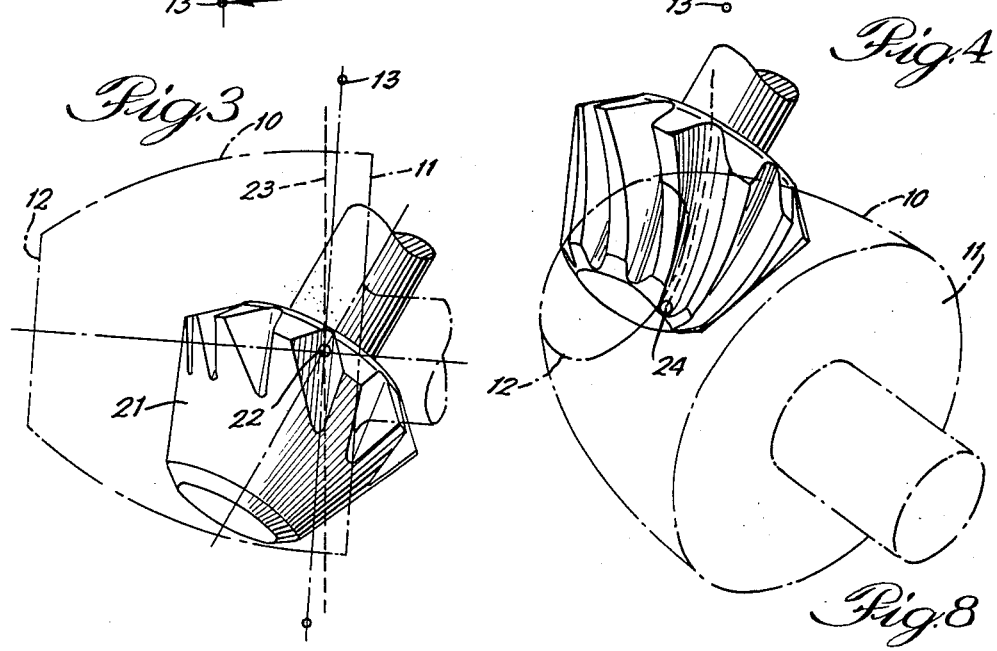
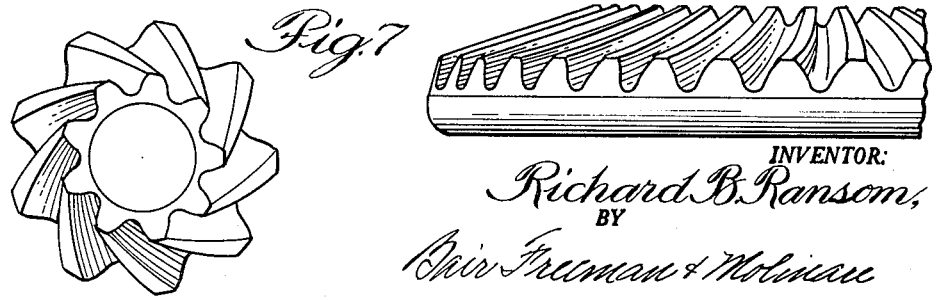
INVENTOR:
Richard B. Ransom,
BY
Burr, Freeman & Molinare
ATTORNEYS.

Aug. 25, 1964 R. B. RANSOM 3,145,621
METHOD OF AND TOOL FOR CUTTING ANNULAR FACE GEARS
Filed Dec. 22, 1961 2 Sheets-Sheet 2

INVENTOR:
Richard B. Ransom,
BY
Burr, Freeman & Molinare
ATTORNEYS.

United States Patent Office
3,145,621
Patented Aug. 25, 1964

3,145,621
METHOD OF AND TOOL FOR CUTTING ANNULAR FACE GEARS
Richard B. Ransom, 629 S. Carroll St., South Bend, Ind.
Filed Dec. 22, 1961, Ser. No. 161,600
8 Claims. (Cl. 90—4)

This invention relates to a method of and tool for cutting gears and more particularly to the hobbing of straight or spiral bevel face gears and pinions for use therewith.

It is one of the objects of the present invention to provide a method of and tool for cutting pinions and annular face gears by which either straight or spiral tooth face gears and pinions therefor can be hobbed accurately and in a minimum amount of time.

Another object is to provide a hob for cutting gears which can be made relatively easily and inexpensively, which is useable on various types of hobbing machines and which can be resharpened and reused with no loss of accuracy.

Another object of the invention is to provide pairs of pinion and mating face gear hobs in which each pair of hobs may be used to cut a wide variety of gear and pinion sizes, and a wide range of tooth inclinations, together with a wide variety of numbers of teeth in each pinion and its mating gear. These objects may be obtained without use of additional gear or pinion hobs, without loss of accuracy or speed in cutting, and by simple adjustment of the motion given to the hob and to the gear or pinion being cut.

According to a feature of the invention, the hob is arcuately barreled and tapered with a spiral tooth or thread thereon gradually tapering in section from the large to the small end of the hob body and slashed and relieved to form a series of cutting surfaces. The form of the hob blank for either a gear or a pinion is mathematically a truncated chordate, formed by revolution of an arc of a circle about the chord which subtends it, and truncated by two planes perpendicular to the chord. The major base of the hob is made by the plane at or immediately near to the radius of the circle perpendicular to the chord; and the minor base of the hob is made by the plane more remote from this radius. In use, as hereinafter more specifically defined, the rotating hob is moved from the larger, or outer, section of the gear or pinion blank to the smaller or inner section and is simultaneously tilted to bring progressively smaller tooth cutting surfaces of the hob into working contact with the gear or pinion blank.

The above and other objects and features of the invention will be more readily apparent from the following description when read in connection with the accompanying drawings, in which:

FIGURE 1 is a side elevation of a hob embodying the invention before slashing and relieving the same;

FIGURE 2 is view similar to FIGURE 1 showing the completed hob;

FIGURE 3 is a plan view of the hob outline in dotted lines, superimposed above a tilted pinion blank set up to show the initial step in hobbing the pinion gear;

FIGURE 4 is a view similar to FIGURE 3 showing a final step in the hobbing operation;

FIGURE 7 is an end view of a completed pinion formed according to the invention; and FIGURE 8 is a partial side view of a spiral bevel gear formed according to the invention.

Figure 5:
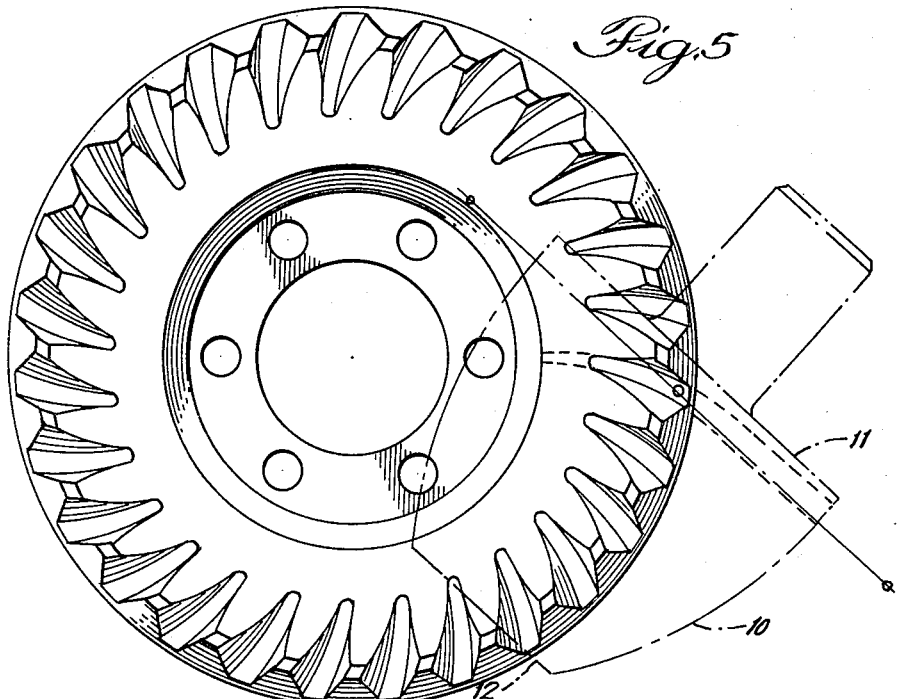
FIGURES 5 and 6 are views similar to FIGURES 3 and 4 illustrating the hobbing of an annular spiral bevel gear.
Figure 6:
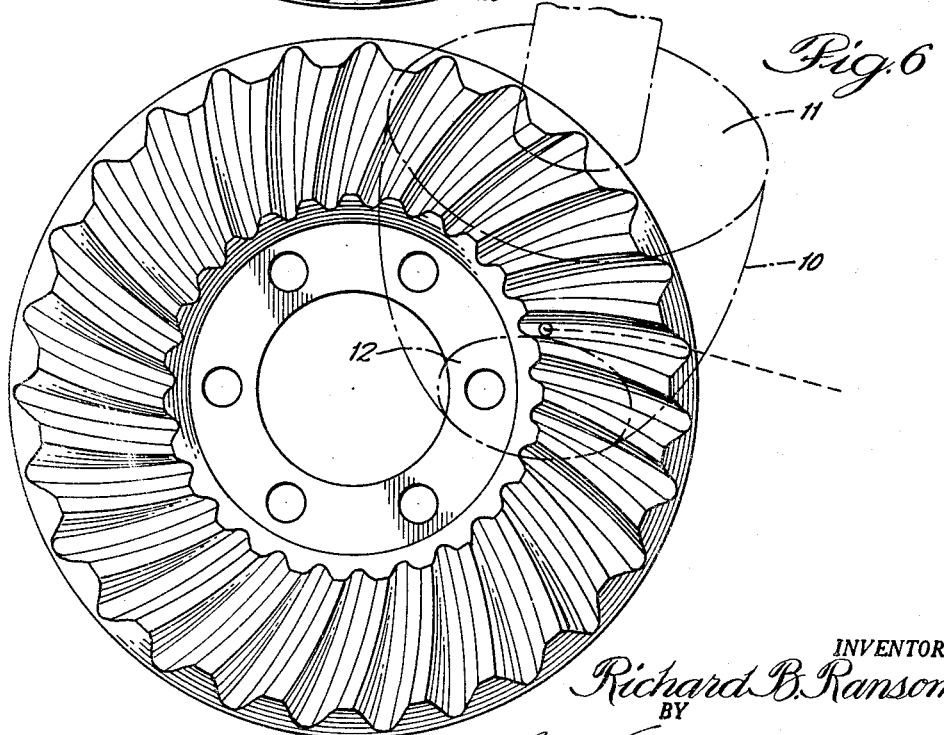

The hob, as best seen in FIGURES 1 and 2, has the outer tips of its single spiral tooth located in the surface of a barrel-shaped or tuncated chordate body, as defined above. The spiral tooth is largest in every dimension at the major base of the hob and progressively decreases in each dimension of the tooth, and in the distance of one convolution of the tooth to the next, down to the minor base of the hob, by a compound progression, more commonly known as a logarithmic progression. As for instance if the hob 10 in FIGURE 1 or FIGURE 2 were drawn to absolute accuracy, and the height of the hob tooth tip 13 of the largest section shown complete at the top of the figure were .25 inch above the root of that tooth convolution, then the height of the next tooth convolution would be: $.25'' \times .9 = .225''$. Likewise the heights of following convolutions would be: $.225'' \times .9 = .2005''$; $.2005'' \times .9 = .18045''$; $.18045'' \times .9 = .162405''$; and $.162405'' \times .9 = .1461645''$; or the smallest tooth convolution on the hob is in height, width, and in every other dimension slightly more than 56% as large as the corresponding dimension of the largest convolution in the specific example assumed. Not only so, but in the shape of the tooth, its dimensions are everywhere proportioned alike and the size of the tooth only is changed in this constant compound progression.

The hob tooth 16 is shown in FIGURES 1 and 2 with an inverse involute flank which, cutting through a blank for a bevel gear or pinion, will form an involute tooth on the blank. While more than 80° of all cylindrical and helical gears for transmission of power have involute teeth, there has been before my invention no method known by which an involute tooth could be accurately constructed for the entire length of the tooth. However, any tooth form where there is no radial undercut on either flank of the tooth form may be successfully and accurately hobbed by a properly inverted tooth flank and root contour on the truncated chordate hob.

The tool, as shown in FIGURE 1, with no further treatment, except for suitable surface hardening, may be used as a lapping tool to perform the final finishing operations on gear teeth by the use of a lapping or cutting compound. However, for hobbing operations the tool is further treated, as shown in FIGURE 2, by forming generally longitudinally extending slashes 18 therein which separate the thread into a series of cutting teeth. Preferably the flanks, tips and roots of each tooth are relieved back of its cutting edge to facilitate cutting. It will be noted that with a spiral tapered tooth, as shown, the relief on each cutting section requires very little removal of metal and in many cases no removal of metal at all except at the root, because of the taper of the tooth. This is particularly true on the larger side of the tooth because of the angle between the tooth and the plane of revolution of the hob. Therefore, even when relief is required, very little relief if any is required on the side of the tooth farther from the conic apex and less than the normal amount of relief on the side of the tooth nearer the conic apex. When the thread or threads have been so slashed, relieved and hardened, the hob is completed, ready for use.

For a hobbing operation, the hob is secured to a driving fixture which will rotate it about its own axis and which will enable it to be tilted about the axis 13 and to be swung bodily about the axis of the blank and parallel to the face of the blank to be cut. For hobbing a pinion, as shown in FIGURES 3 and 4, the hob is initially positioned relative to the pinion, as illustrated in FIGURE 3, with the large end of the hob registering with the large end of the pinion blank and with the spiral teeth on the hob aligned with the desired pinion teeth. As seen in FIGURES 3 and 4, the hob is illustrated in dot-dash outline above the pinion blank shown at 21. In this relative position of the hob and the blank the hob teeth at the larger end of the hob will cut to full depth at approximately the point 22 in the blank and will shape the flanks of the pinion teeth accurately at the point 22. Up to that point, the hob teeth will travel in their cutting action along the dotted line 23 which is parallel to the desired pinion teeth at the point of cutting.

As the cutting operation continues beyond point 22, the hob will be tilted about the center 13, will be moved bodily about the pinion blank parallel with the conic envelope of the pinion and will be swung in a logarithmic curve to follow the curvature of the pinion teeth. FIGURE 4 illustrates the final cutting position wherein the teeth at the small end of the hob are cutting the full depth at the point 24 at the small end of the pinion blank. When the hob reaches this position relative to the pinion blank the pinion teeth have been fully cut from end to end of the pinion and the pinion is completed except for whatever additional finishing operations may be desired. It will be noted that the pinion teeth as finally cut will taper from the large end to the small end of the pinion in a logarithmic progression, and that their size and shape will be determined by the size and shape of the teeth on the hob.

For hobbing a bevel or spiral bevel face gear the process is precisely the same except that the conic envelope locating the tips or the roots of the gear teeth have a flatter conic angle than the meshing pinion gear. Due to the larger number of teeth in the face gear, however, the face gear tooth swings through a smaller angle about the conic axis.

It will be seen that with the hob and according to the method of the present invention either flat gears or bevel gears with either straight radial teeth or spiral teeth can be cut quickly and accurately. As the hob becomes dulled in use it may be resharpened by regrinding the slashes 18 to produce new cutting surfaces on the forward ends of the cutting teeth. Even though the section at the forward ends of the cutting teeth will be reduced by this grinding operation, the hob can be continued to be used to produce accurate gear teeth of the same size simply by adjusting the mounting of the hob so that the hob is mounted at the beginning of the operation with the starting cutting point on the tooth moved toward the large end of the tooth by as great a distance as the sharpening process has widened the flutes in the large end of the hob. This will never be more than a small fraction of an inch.

It should be noted that in any spiral bevel gear and pinion as compared with a straight tooth bevel gear and pinion, the spiral gear tooth of a given thickness occupies more circumferential space than the straight tooth; and that this circumferential space per gear tooth is increased strictly in proportion to the secant of the constant angle which the spiral bevel tooth tip makes with every conic element which it crosses. That is, a spiral bevel gear with a large spiral angle and a flat slope around the cone of the gear must have fewer teeth or a larger diameter gear or smaller teeth. The truncated cordate hob made for a given size gear and tooth slope, however, may be aligned with the gear blank at any of a large number of spiral angles, to increase or decrease the number of teeth as well as to decrease or increase the slope of the teeth. But the average cross section of the gear teeth at any given level of the gear between the major and minor frustra of the gear is unchanged at different spiral angles because at that given level the same part of the same hob cut them. Not only so, but contrary to appearances the two sides of the constant angle gear tooth are precisely alike and of the same size at the same level. In spite of the fact that the lower side of the gear tooth seems smaller than the upper side, it is precisely of the same length from bottom to top of the gear and is exactly at the same angle with every element of the cone that it crosses.

The truncated chordate hob tooth increases and decreases in size at a fixed and constant geometrical ratio regardless of what position in the hob is at the starting point, so that by simply starting the cutting at a smaller or a larger part of the tapered hob tooth it will fit a correspondingly smaller or larger gear blank and produce a smaller or a larger gear both exactly alike other than size; and any one of the many gear sizes having great flexibility as to choice of spiral angles and number of teeth in the gear.

While one embodiment of the invention has been shown and described herein, it will be understood that it is illustrative only and not to be taken as a definition of the scope of the invention, reference being had for this purpose to the appended claims.

What is claimed is:

1. The method of cutting a gear with a cutting tool having a barreled tapered hob body and a series of cutting teeth arranged in a spiral track and gradually decreasing in size from the larger to the smaller end of the body, said method comprising rotating the body about its own axis, bringing the cutting teeth at the larger end of the body into cutting engagement with the peripheral outer portion of a blank while the body is rotating to cut teeth in the peripheral portion of the blank, and simultaneously moving the body relative to the face of the blank in a line parallel to the teeth to be cut in the blank and tilting the axis of the body relative to the face of the blank to bring progressively smaller cutting teeth into cutting engagement with the blank as the body moves.

2. The method of claim 1 in which the hob body is arcuately curved about an axis external to the body and the body is tilted about said axis during cutting.

3. The method of cutting a gear with a cutting tool having a barreled tapered hob body and a series of cutting teeth arranged in a spiral track and gradually decreasing in size from the larger to the smaller end of the body, said method comprising rotating the body about its own axis, bringing the cutting teeth at the larger end of the body into cutting engagement with the peripheral outer portion of a blank while the body is rotating to cut teeth in the peripheral portion of the blank, simultaneously moving the body relative to the face of the blank in a line parallel to the teeth to be cut in the blank and tilting the axis of the body relative to the face of the blank to bring progressively smaller cutting teeth into cutting engagement with the blank as the body moves, and swinging the body about the axis of the bank to maintain the teeth on the hob body in alignment with the teeth to be cut in the blank.

4. A tool for cutting gears comprising a tapered barreled hob body having a larger end and a smaller end and a spiral thread on the body tapering in section from the larger to the smaller end of the body.

5. A tool for cutting gears comprising a tapered barreled hob body having a larger end and a smaller end and a spiral thread on the body tapering in section from the larger to the smaller end of the body, said spiral thread being interrupted periodically to define cutting edges and being relieved back of the cutting edge.

6. A tool for cutting gears comprising a tapered barreled hob body having a larger end and a smaller end and a spiral thread on the body progressively tapering from the larger to the smaller end of the body at a uniform logarithmic rate so that the thread tapers upward and downward from any point therein at the same rate.

7. A tool for cutting gears comprising a tapered barreled hob body having a larger end and a smaller end and a spiral thread on the body progressively tapering from the larger to the smaller end of the body at a uniform logarithmic rate so that the thread tapers upward and downward from any point therein at the same rate, the thread being slashed to define cutting edges and being relieved back of the cutting edges.

8. The tool of claim 4 in which the contour of the hob body is mathematically a truncated chordate formed by revolution of an arc of a circle about the chord which subtends it, and having the radial center of the chord outside the hob body and lying in a plane perpendicular to the axis of the hob at the center of the whole length of the chord before the figure is truncated, and having the major base of the hob located by a truncating plane perpendicular to the axis and adjacent to a radial plane containing the center of the chord, and the minor base of the hob located by a truncating plane perpendicular to the axis of the hob and more remote from the radial plane containing the center of the chord.

References Cited in the file of this patent

UNITED STATES PATENTS

| | | |
|---|---|---|
| 1,086,542 | Lees | Feb. 10, 1914 |
| 1,707,105 | Wheatly | Mar. 26, 1929 |
| 1,882,008 | Head | Oct. 11, 1932 |
| 2,050,233 | Head | Aug. 4, 1936 |
| 2,615,359 | Cook | Oct. 28, 1952 |
| 2,700,324 | Staples et al. | Jan. 25, 1955 |
| 2,731,886 | Saari | Jan. 24, 1956 |
| 2,916,803 | Wildhaber | Dec. 15, 1958 |
| 3,015,151 | Pergande | Jan. 2, 1962 |

FOREIGN PATENTS

| | | |
|---|---|---|
| 896,907 | Germany | Dec. 14, 1953 |